US009151944B2

(12) United States Patent
Liu et al.

(10) Patent No.: US 9,151,944 B2
(45) Date of Patent: Oct. 6, 2015

(54) METHOD AND APPARATUS FOR NAVIGATING STACKED MICROSCOPY IMAGES

(75) Inventors: Ming-Chang Liu, San Jose, CA (US); Mark Robertson, Cupertino, CA (US)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 13/553,462

(22) Filed: Jul. 19, 2012

(65) Prior Publication Data

US 2014/0022236 A1    Jan. 23, 2014

(51) Int. Cl.
*G06T 15/00* (2011.01)
*G02B 21/36* (2006.01)
*G06T 19/00* (2011.01)

(52) U.S. Cl.
CPC .............. *G02B 21/367* (2013.01); *G06T 19/00* (2013.01); *G06T 2210/41* (2013.01); *G06T 2219/028* (2013.01)

(58) Field of Classification Search
CPC ...... G02B 21/367; G02B 13/36; G02B 7/097; G02B 27/0075; G02B 7/08; G02B 7/28; G06T 19/00; G06T 2219/028; G06T 2210/41; H04N 5/23212; G02N 7/38
See application file for complete search history.

(56) References Cited

U.S. PATENT DOCUMENTS

| 6,038,067 | A | 3/2000 | George |
| 6,201,899 | B1 | 3/2001 | Bergen |
| 7,068,266 | B1* | 6/2006 | Ruelle ........................ 345/418 |
| 2005/0270370 | A1 | 12/2005 | Uemura et al. |
| 2006/0038144 | A1 | 2/2006 | Maddison |
| 2008/0131019 | A1 | 6/2008 | Ng |
| 2010/0188424 | A1* | 7/2010 | Cooke et al. ................. 345/660 |
| 2011/0141103 | A1 | 6/2011 | Cohen et al. |

FOREIGN PATENT DOCUMENTS

| JP | 04348476 A | 12/1992 |
| JP | 11275572 A | 10/1999 |
| JP | 2001298755 A | 10/2001 |
| JP | 2002514319 A | 5/2002 |
| JP | 2003287987 A | 10/2003 |
| JP | 2004354469 A | 12/2004 |
| JP | 2005099832 A | 4/2005 |
| JP | 2005148584 A | 6/2005 |
| JP | 2008139579 A | 6/2008 |
| JP | 2010170025 A | 8/2010 |
| JP | 2011007872 A | 1/2011 |
| JP | 2011118005 A | 6/2011 |
| WO | WO-86/04758 | 8/1986 |

OTHER PUBLICATIONS

Zerene Systems: First Video on Introduction to Retouching based on link of "How to Use Zerene Stacker" of Jun. 16, 2011 with transcript. The link to the video is: https://web.archive.org/web/20111128064711/http://www.zerenesystems.com/cms/stacker/docs/videotutorials/retouching001/index.*

(Continued)

*Primary Examiner* — Sing-Wai Wu
(74) *Attorney, Agent, or Firm* — Moser Taboada (57) ABSTRACT

A method for navigating images in microscopic imaging, the method comprising reducing dimensionality of an original sequence of images of a specimen for navigation using an all-focus image and providing a user interface to a user for navigating the original sequence of images and the all-focus image.

20 Claims, 10 Drawing Sheets

(56) References Cited

OTHER PUBLICATIONS

Robertson, M.A. and Liu, M.-C., "Method to Improve Depth of Field in Microscopy". Sony Invention Disclosure, IPD No. 3513, 2010.
Pieper, R. J. and Korpel, A., "Image Processing for Extended Depth of Field." Applied Optics, 1983, vol. 22, pp. 1449-1453.
Goldsmith, Noel T., "Deep Focus; A Digital Image Processing Technique to Produce Improved Focal Depth in Light Microscopy." Image Analysis and Stereology, 2000, vol. 19, pp. 163-167.
Forster, Brigitte, et al., "Complex Wavelets for Extended Depth-of-Field: A New Method for the Fusion of Multichannel Microscopy Images." Microscopy Research and Technique, 2004, vol. 65, pp. 33-42.
Aguet, Francois, Van De Ville, Dimitri and Unser, Michael, "Model-Based 2.5-D Deconvolution for Extended Depth of Field in Brightfield Microscopy." IEEE Transactions on Image Processing, Jul. 2008, Issue 7, vol. 17, pp. 1144-1153.
Wu, H.-S., Barba, J and Gil, J., "A Focusing Algorithm for High Magnification Cell Imaging." Journal of Microscopy, 1996, vol. 184, pp. 133-142.
Zhi-Guo, Jiang, et al., "A Wavelet Based Algorithm for Multiple-Focus Micro-Image Fusion." 2004. Proceedings of the Third International Conference on Image and Graphics. pp. 176-179.
European Search Report for Application No. 13174734.7-1562, dated Oct. 21, 2013, 9 pages.
"How to Use Zerene Stacker", downloaded from website: http://zerenestems.com/cms/stacker/docs/howtouseit, 8 pages, version of Jun. 16, 2011.
Office Action dated May 26, 2014, Japan Patent Application No. 2013144309, 10 pages.
First Office Action from the European Patent Office dated Jan. 19, 2015 for corresponding European Application No. 13 174 734.7-1562, 8 pages.
Said, Pertuz, et al., "Generation of All-in-Focus Images by Noise-Robust Selective Fusion of Limited Depth-of-Field Images", IEEE Transactions on Image Processing, vol. 22, No. 3, Mar. 2013, pp. 1242-1251.
"Retouching in Helicon Focus" —downloaded from www.youtube.com/watch?v=z984OljCuPA.

* cited by examiner

METHOD AND APPARATUS FOR NAVIGATING STACKED MICROSCOPY IMAGES

BACKGROUND

1. Field of the Invention

Embodiments of the present invention generally relate to managing digital microscopy images and, more specifically, to a method and apparatus for navigating stacked microscopy images.

2. Description of the Related Art

In digital microscopy, whole-slide images often take the form of a Z-stack, which is a collection of images, each image taken with a different focus depth. Digital microscopy utilizes virtual slide systems having automated digital slide scanners that create a digital image file of an entire glass slide. The digital image file is referred to as a whole-slide image, which, in some embodiments, has a spatial resolution of approximately 100,000 pixels by 100,000 pixels. Therefore, Z-stacks are generally large sized data sets. Due to the large size of Z-stacks, navigation of Z-stacks becomes cumbersome and time consuming. For high magnification, capturing images for several slices of the specimen may be necessary to ensure in-focus capture of the specimen. For example, 32 to 64 images may be required. Browsing and analyzing a 3-D data set of an example size of 100,000×100,000×64 pixels becomes a cumbersome task for an operator.

Thus, there is a need for method and apparatus for navigating stacked microscopy images.

SUMMARY OF THE INVENTION

An apparatus and/or method for navigating stacked images in microscopy, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention are directed towards an apparatus and/or a method for navigating images in microscopic imaging, substantially as shown in and/or described in connection with at least one of the figures, as set forth more completely in the claims. According to an embodiment, the method for navigating images in microscopic imaging comprises making use of an all-focus image of a specimen thereby reducing the dimensionality of the data being navigated and the use of a snap to focus feature that brings to focus a user specified portion of the specimen by showing the most relevant image from a Z-stack of the original slide.

Figure 1:
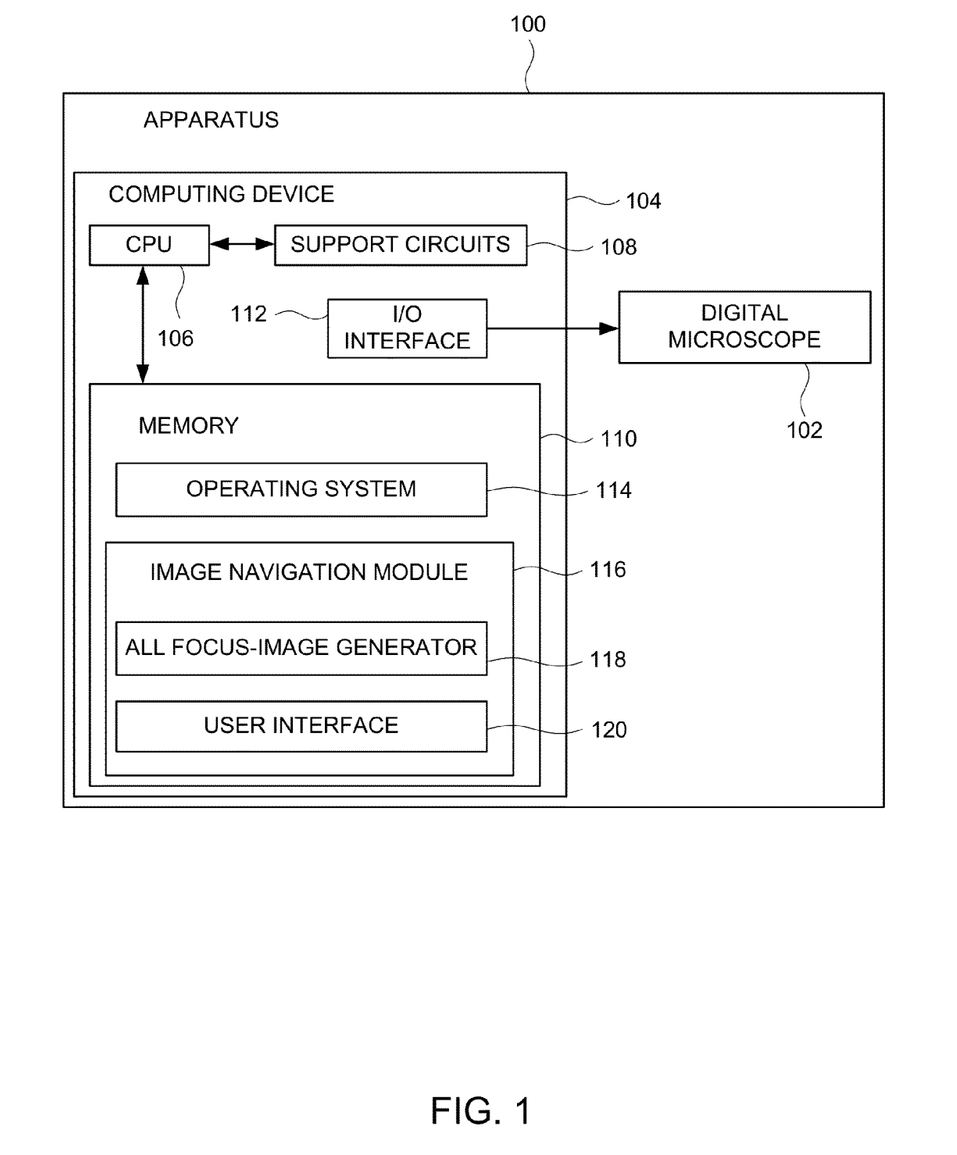
FIG. 1 depicts a block diagram of apparatus for navigating stacked microscopy images using a digital microscope, in accordance with exemplary embodiments of the present invention.

FIG. 1 depicts a block diagram of apparatus 100 for navigating stacked microscopy images using a digital microscope 102, in accordance with exemplary embodiments of the present invention. The apparatus 100 comprises a digital microscope 102 and a computing device 104.

The digital microscope 102 captures digital images of a specimen at different depths to create a sequence of images, i.e., a Z-stack of images. For purposes of illustration, the sequence of digital images is represented by following expression: $I(x, y, z)$, where $(x, y)$ is a spatial index with $x=0$ to $X-1$ and $y=0$ and $Y-1$ and $z$ is the depth index with $z=0$ to $Z-1$ [expression A].

In certain embodiments, the digital microscope 102 is coupled to the computing device 104 through the I/O interface 112. In other embodiments, a stack of images may be created by the microscope 102 and indirectly transferred to the computing device 104, e.g., via memory stick, compact disk, network connection and the like.

The computing device 104 comprises a Central Processing Unit (or CPU) 106, support circuits 108, a memory 110 and an I/O interface 112. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, and the like. The memory 110 comprises at least one of Read Only Memory (ROM), Random Access Memory (RAM), disk drive storage, optical storage, removable storage and/or the like.

The memory 110 comprises an Operating System (OS) 114 and an image navigation module 116. The image navigation module 116 comprises an all focus-image generator 118 and a user interface 120. In certain embodiments, the user interface 120 may be rendered to an external display coupled to the I/O interface 112.

The all focus-image generator 118 generates an all focus-image. As used herein, the term "all-focus image" refers to the reduction of a Z-stack of a sequence of images of a specimen on a slide from three dimensions to two dimensions such that the result contains the entire specimen in focus. According to one embodiment, the all-focus image is formed by weighting each image according to a particular measure and combining the weighted images accordingly, as described in commonly assigned U.S. patent application Ser. No. 13/553,265 filed Jul. 19, 2012, hereby incorporated by reference in its entirety. The all-focus image is a composite of portions of the images in the Z-stack that are in focus at each focus depth.

In operation, the computing device 104 implements the image navigation module 116. The image navigation module 116 facilitates navigation of microscopy images of a specimen captured using the digital microscope 102. The image navigation module 116 allows linking back to the original sequence of images, in accordance with user needs.

Figure 2:
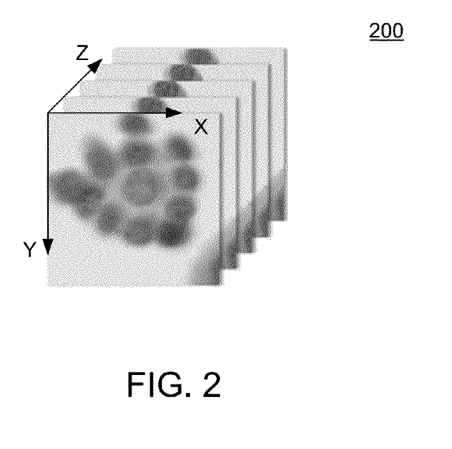
FIG. 2 depicts an example Z-stack, in accordance with exemplary embodiments of the present invention.

FIG. 2 depicts an example Z-stack 200 generated by the digital microscope 102. Each image in the Z-stack is focused at a different depth in the specimen. The digital microscope 102 captures digital images of a specimen at different focus depths to create a sequence of images. Thus, focus depth is incremented throughout the depth of the specimen to capture the entire specimen in focus in at least one of the digital images. The sequence of digital images is stacked along the Z dimension corresponding to depth, in addition to spatial dimensions X and Y, in the Z-stack.

Figure 3:
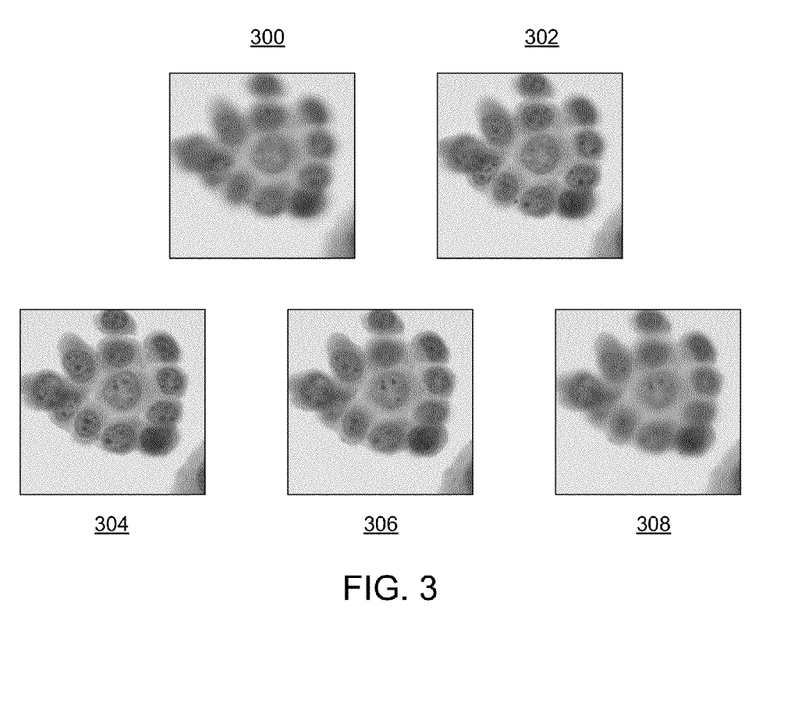
FIG. 3 depicts five individual slices of digital images of FIG. 2, in accordance with exemplary embodiments of the present invention.

FIG. 3 depicts five individual images from the Z-stack of FIG. 2, in accordance with exemplary embodiments of the present invention. FIG. 3 illustrates each of the images having different areas in focus. As the user focuses the digital microscope 102, a different image from the Z-stack 200 is shown to the user, representing a particular depth of focus in the specimen and the portion of the specimen which is in focus at that depth.

Figure 4:
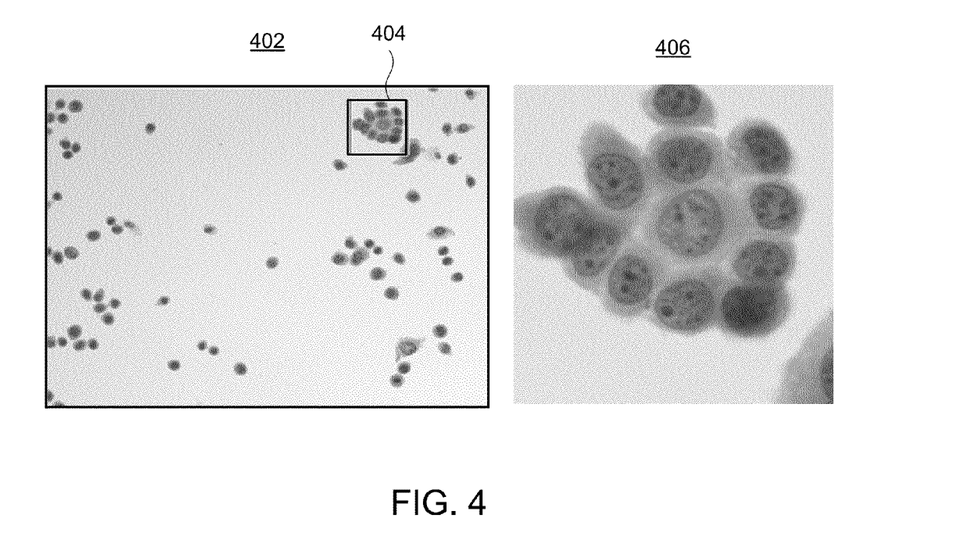
FIG. 4 depicts an example of overview window for providing context for content currently being viewed, in accordance with exemplary embodiments of the present invention.

FIG. 4 depicts an example of overview window 402 for providing context for content currently being viewed, in accordance with exemplary embodiments of the present invention.

The all-focus image generated by the all focus-image generator 118 represents all of the in-focus information present in the Z-stack, without the out-of-focus blur. View 402 shows the entire slide view zoomed out to show all specimen content. The selected portion 404 of view 402 is, according to one embodiment, determined by a user of the user interface 120. The selected portion 404 is shown in view 406, as a magnified view of the selected portion.

Figure 5:
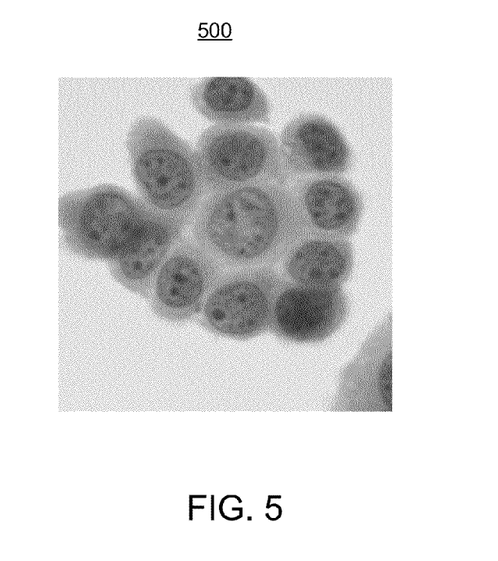
FIG. 5 depicts example of all-focus image for snapshots shown in FIGS. 2 and 3, in accordance with exemplary embodiments of the present invention.

FIG. 5 depicts example of all-focus image 500 for the view in 404 shown in FIG. 4, in accordance with exemplary embodiments of the present invention. The all-focus image 500 is generated by the all-focus image generator 118 of the image navigation module 116 as shown in FIG. 1.

Figure 6:
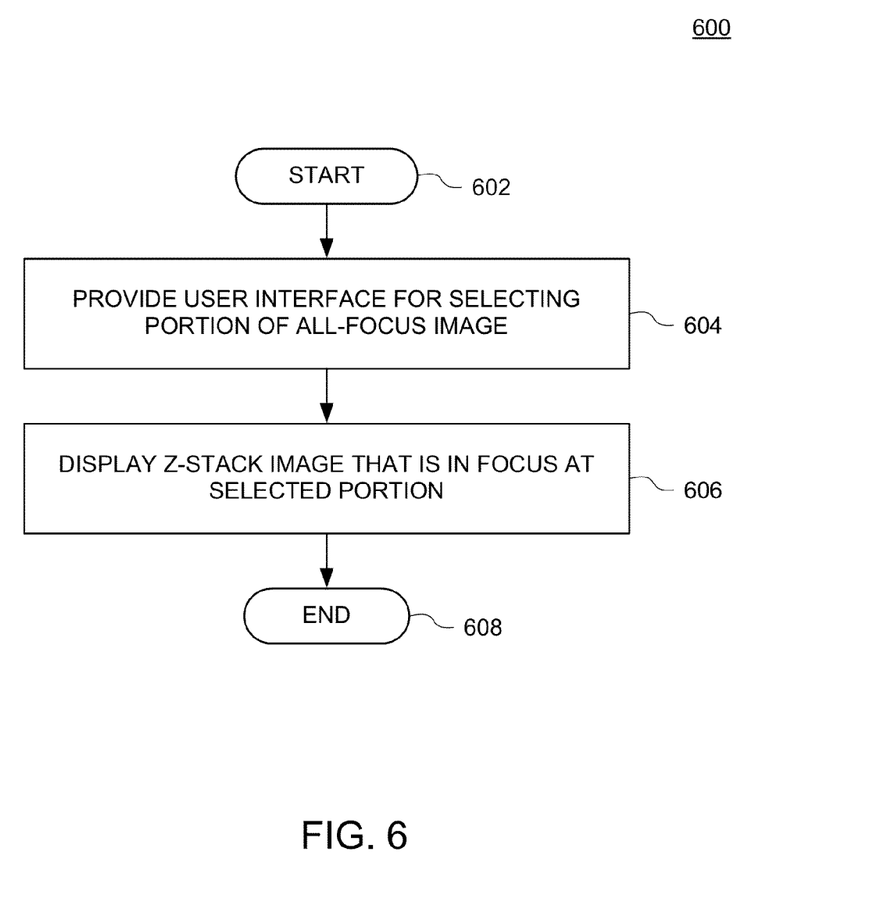
FIG. 6 depicts a flow diagram of a method for navigating images in microscopy using a digital microscope, in accordance with exemplary embodiments of the present invention.

FIG. 6 depicts a flow diagram of a method 600 for navigating microscopy images, as performed by the image navigation module 116 executed by the CPU 106 of FIG. 1, in accordance with exemplary embodiments of the present invention. The method begins at step 602 and proceeds to step 604.

At step 604, the method 600 provides a user interface to a user for selecting a portion of an all-focus image composed from a set of images forming Z-stack. As described above, the digital microscope 102 produces a sequence of two-dimensional (2D) images, each with an X and Y component. The sequence of 2D images is collected and each 2D image is assigned a "Z" dimension, forming a 3D representation of the specimen being viewed in the digital microscope 102 otherwise known as the Z-stack. The all-focus image 500 shown in FIG. 5 represents the Z-stack blended together, as described in the co-related and commonly assigned U.S. patent application Ser. No. 13/553,265 filed Jul. 19, 2012.

At step 606, the method 600 displays an image from the Z-stack that is in focus at the selected portion of the all-focus image. In certain embodiments, the image navigation module 116 facilitates presentation of (or rendering) the all-focus image generated by the all focus-image generator 118 on the I/O interface 112 for direct browsing. In certain use case scenarios, if the user finds a region of interest in a presented all-focus image or an overview image, which is an image captured of the entire slide containing the specimen, the user interface 120 of the image navigation module 116 allows switching to the view of the original Z-stack associated with the region of interest.

According to one embodiment, the user interface 120 provides the user a view of only the all-focus image for initial browsing, in conjunction with swapping between the all-focus image and the original Z-stack. In alternative embodiments, the user interface 120 provides the user with a split-screen view, where one portion of the screen shows a window of the all-focus image and another portion of the screen shows a window of the original Z-stack. The two windows of the split-screen view may be overlapping or non-overlapping. The window of the original Z-stack may be continually present, or it is visible only when indicated by the user.

In certain embodiments, the user interface 120 allows the user to identify a point (x, y) or area surrounding the point (x, y) in at least one of the all-focus image and the original Z-stack. Upon identification of the point (x, y) or area surrounding the point (x, y), in the Z-stack view rendered on the user interface 120, the displayed image allows switching to the image which is most in focus at the point (x, y) or the area surrounding point (x, y). An image is known to be most in focus at a particular point by determining which image among the Z-stack has been marked as focus at that position. If the point (x, y) has more than one unique focused depth, the image navigation module 116 facilitates presentation of multiple slices from the original Z-stack data to the user.

According to one embodiment, the user interface 120 of the image navigation module 116 allows cycling through the different in-focus images as the user selects an area. In other embodiments, the image navigation module 116 facilitates assignment of different meaning to different input selection methods. For example, a mouse left-button click event triggers selection of the most in-focus slice, while a right-button click event triggers selection of the second-most in-focus slice. In all the above cases, browsing is controlled through any means, such as keyboard, mouse, touch pad, trackball, touch screen, controller pad, a gesture-based user interface or the like. In all of the above cases, the user interface 120 of the image navigation module 116 renders an overview window to indicate context for the main window.

In certain embodiments involving display of both the all-focus image and the Z-stack data, the viewpoints of the two images are synchronized, i.e. the display for the all-focus image display shows the same spatial area as shown by the display for the Z-stack data.

In certain embodiments, the user interface 120 allows the user to browse the all-focus image and ensures that all details, such as the in-focus content, are visible to the user simultaneously. The user interface 120 allows the user to browse in two spatial dimensions without the added complexity of browsing a third depth dimension. The user interface 120 allows the user to find objects or regions of interest and as well as accessing and viewing the original Z-stack data if desired. The method 600 proceeds to step 608 and ends.

In FIGS. 7-12, several examples of different manifestations of the user interface 120 are disclosed, though the user interface 120 is not limited to the depicted manifestations.

Figure 7:
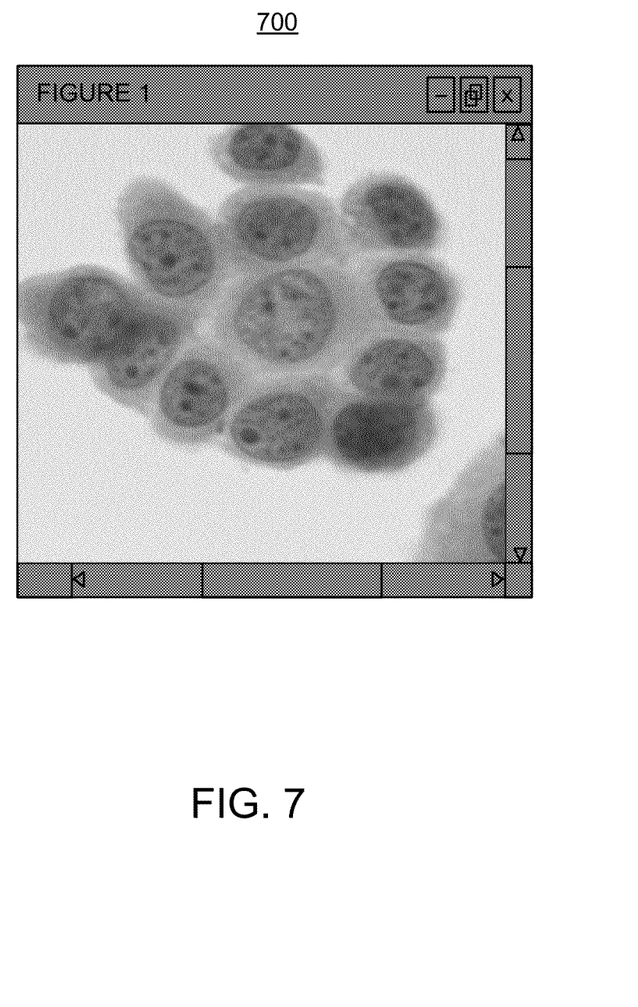
FIG. 7 depicts an example of a first manifestation of the user interface, in accordance with exemplary embodiments of the present invention.

FIG. 7 is an example of a first manifestation 700 of the user interface, in accordance with exemplary embodiments of the present invention. As shown in FIG. 7, a single window of the all-focus image is visible. The user interface 120 allows browsing of the all-focus image and upon indication by the user, the window of the all-focus image is switched to the original Z-stack data. The first manifestation of the user interface 120 allows the user to find areas (i.e. regions) of interest in the specimen rapidly, after which it is possible to manually adjust the fine focus.

Figure 8:
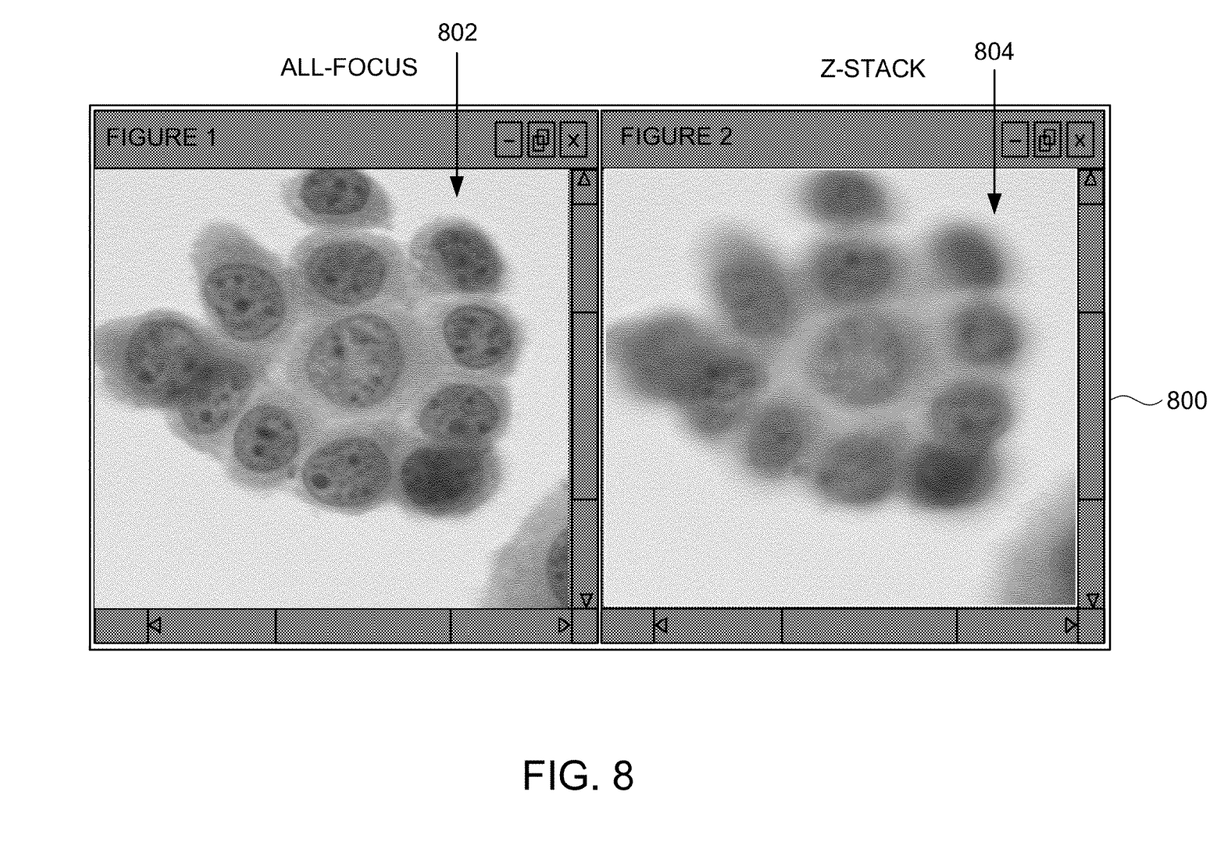
FIG. 8 depicts an example of a second manifestation of the user interface, in accordance with exemplary embodiments of the present invention.

FIG. 8 is an example of a second manifestation 800 of the user interface, in accordance with exemplary embodiments of the present invention. As shown in FIG. 8, both the all-focus image 802 and the Z-stack 804 are shown simultaneously on the same screen 800. The screen 800 is indicated by a rectangular box comprising a pair of windows, one for the all-focus image 802 and the other for the Z-stack 804. The views of the pair of windows are synchronized so that the same content is visible in the pair of windows, even as the images are browsed spatially.

Figure 9:
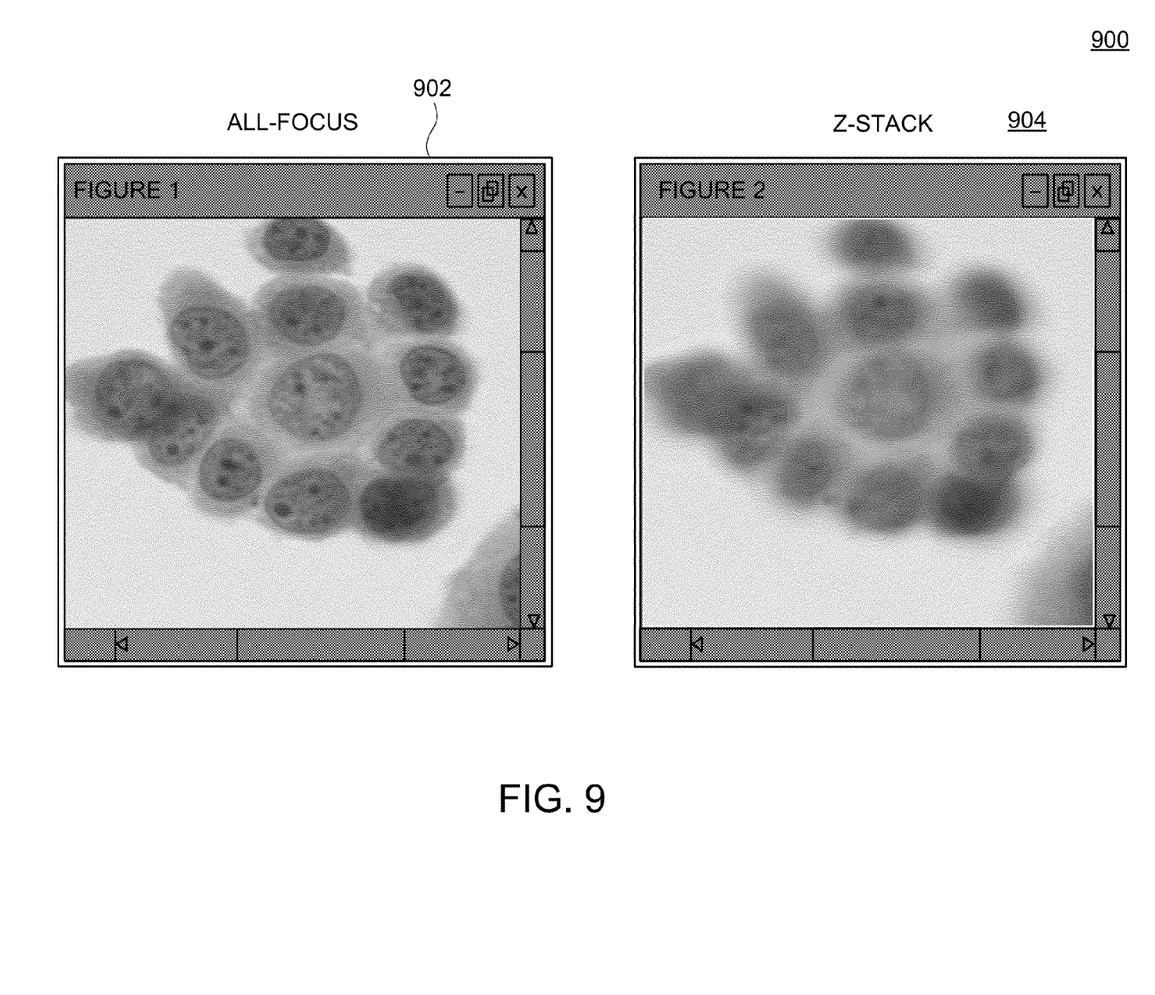
FIG. 9 depicts an example of a third manifestation of the user interface, in accordance with exemplary embodiments of the present invention.

FIG. 9 is an example of a third manifestation 900 of the user interface, in accordance with exemplary embodiments of the present invention. As shown in FIG. 9, the all-focus image 902 and the Z-stack 904 are shown on separate screens, which assume a multi-display environment. The screens are indicated by a pair of rectangular boxes. The left rectangular box comprises a window for the all-focus image 902, whereas the right rectangular box comprises a window for the Z-stack 904. The views of the pair of windows are synchronized so that the same content is visible in the two windows as the images are browsed spatially.

Figure 10:
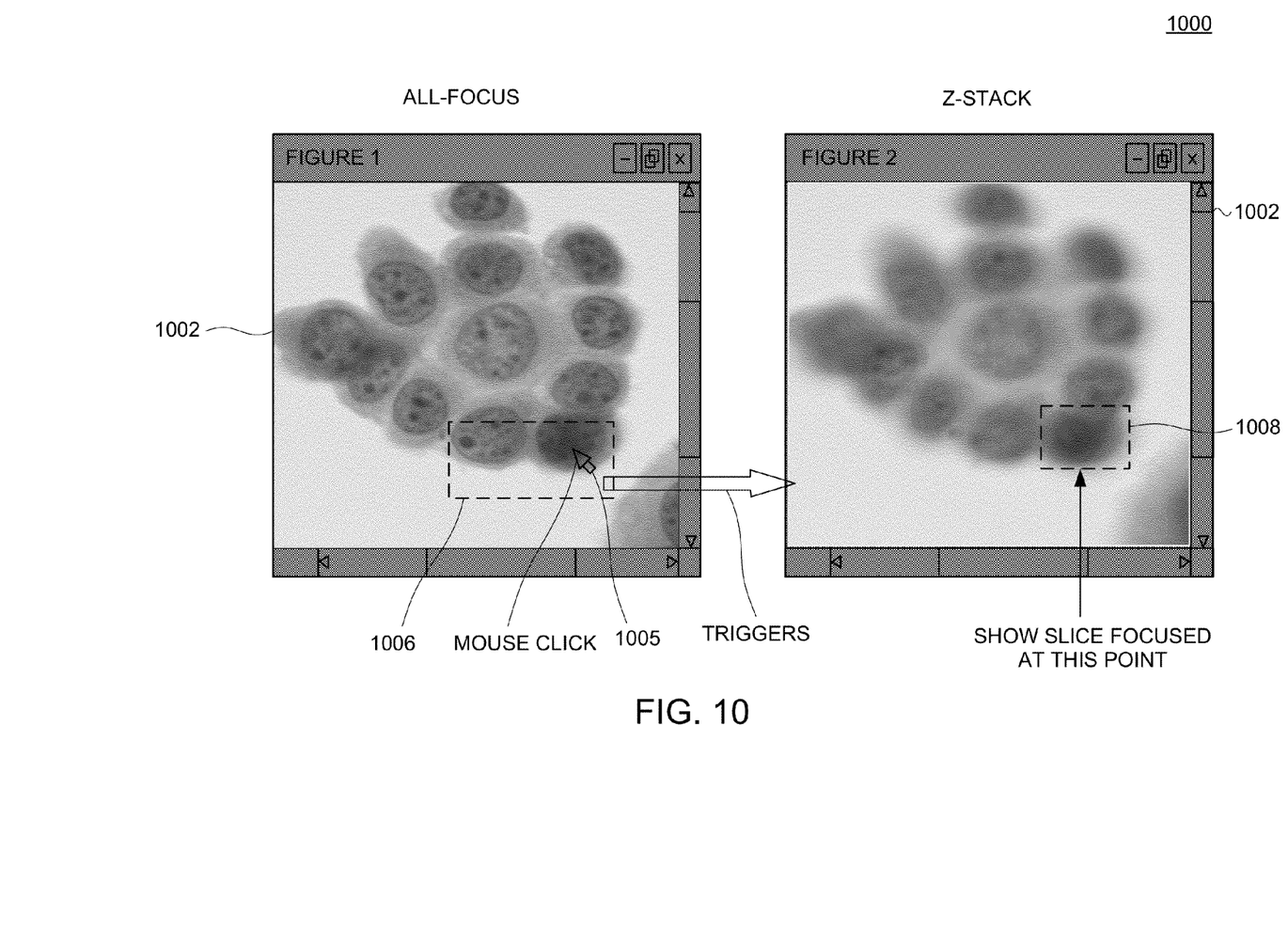
FIG. 10 depicts an example of a fourth manifestation of the user interface, in accordance with exemplary embodiments of the present invention.

FIG. 10 is an example of a fourth manifestation 1000 of the user interface, in accordance with exemplary embodiments of the present invention. As shown in FIG. 10, a mouse cursor 1005 hovers above the all-focus image in the display window 1002. A mouse click event on the all-focus image at region 1006 triggers selection of a point in the all-focus image. The image slice in the original Z-stack that is most in focus for the selected point is automatically shown in the display window 1002. The portion selected by the user, i.e., region 1006, is the region 1008 that is shown in focus in the display window 1004.

Figure 11:
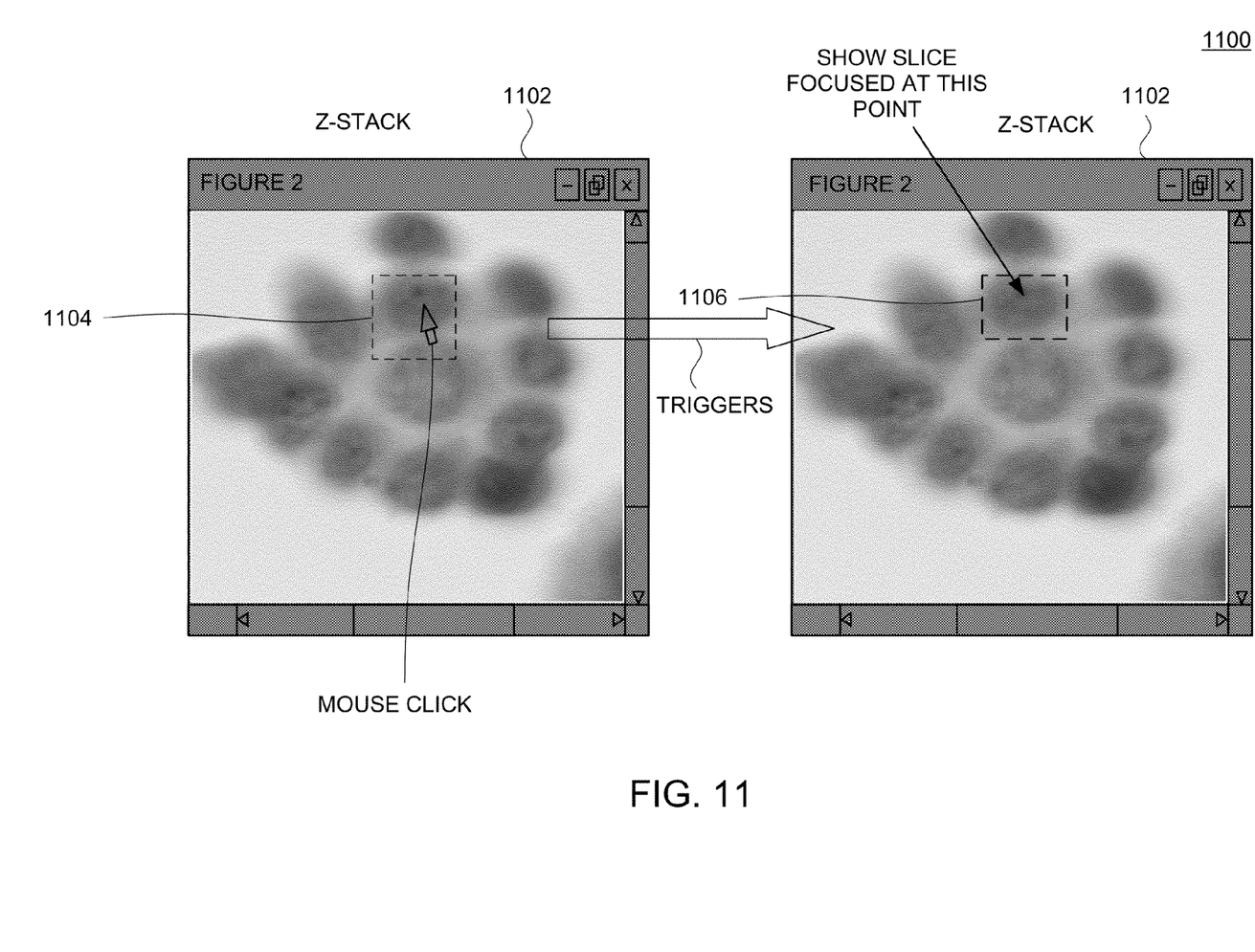
FIG. 11 depicts an example of a fifth manifestation of the user interface, in accordance with exemplary embodiments of the present invention.

FIG. 11 is an example of a fifth manifestation 1100 of the user interface, in accordance with exemplary embodiments of the present invention. As shown in FIG. 11, instead of making use of the all-focus image, the Z-stack is directly browsed in display window 1102. A region of interest 1104 is selected in the display window 1102. The image slice in the original Z-stack that is most in focus for the selected point, depicted as region 1106 in display 1102, is automatically shown in the display window 1102.

Figure 12:
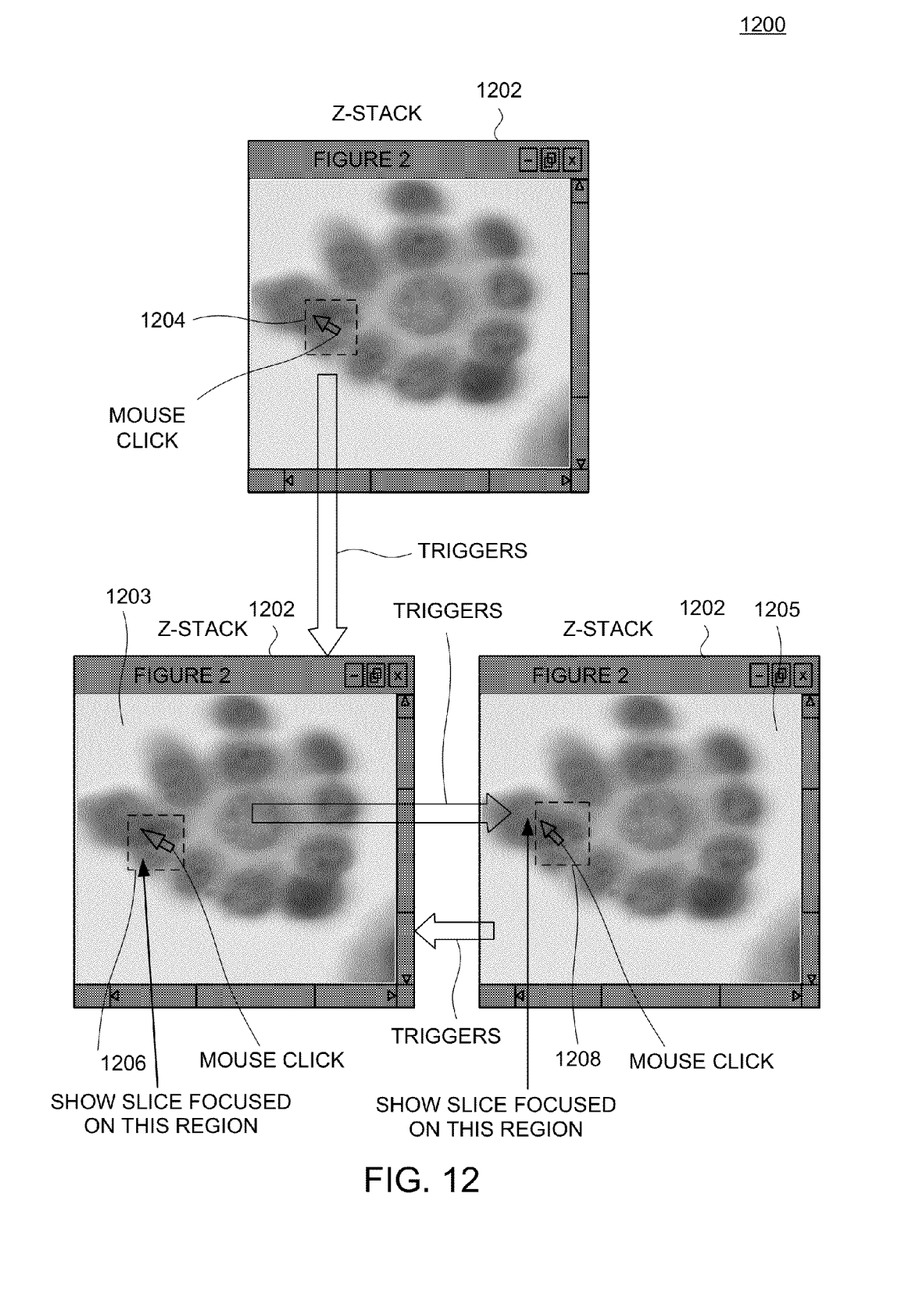
FIG. 12 depicts an example of a sixth manifestation of the user interface, in accordance with exemplary embodiments of the present invention.

FIG. 12 is an example of a sixth manifestation 1200 of the user interface, in accordance with exemplary embodiments of the present invention. Display window 1202 initially shows a Z-stack image of a specimen. Upon initial position selection 1204, the user interface 120 displays the most in-focus slice of the image at that position 1206. Upon further selection or indication by the user, the user interface 120 switches to a second view with the second-most in-focus slice at 1208. Further, mouse clicks or other indication by the user signals the user interface 120 to continue cycling among or between the different in-focus slices at the selected position 1208.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for navigating images in microscopic imaging, the method comprising:
   providing a user interface with two or more views to a user for selecting, in a first view of the two or more views, a portion of an all-focus image composed from an original sequence of images of a specimen at different depths of focus, the original sequence of images forming a Z-stack, wherein providing the user interface further comprises:
   identifying at least one of a point, and an area surrounding the point, in at least one of the all-focus image, and the original sequence of images; and
   switching to an image which is most in focus, relative to other images in the original sequence of images, at the at least one of the point, and the area surrounding the point, in the original sequence of images; and
   synchronously displaying, in a second view of the two or more views, one or more images from the Z-stack that are in focus at the selected portion of the all-focus image, wherein the one or more images are sequentially displayed in response to user input according to a depth of focus, the user input comprising one or more of a mouse click, touch input, gesture and keyboard input.

2. The method of claim 1, further comprising forming the all-focus image by reducing dimensionality of the original sequence of images of a specimen.

3. The method of claim 2, wherein reducing dimensionality comprises
   reducing the original sequence of images from three dimensions to two dimensions.

4. The method of claim 3, wherein the reducing comprises:
   combining the original sequence of images with differing focus depths to form the all-focus image.

5. The method of claim 1, wherein providing the user interface comprises:
   rendering at least one of the all-focus image and the original sequence of images; and
   alternating between displaying the all-focus image and the original sequence of images based on the selected portion.

6. The method of claim 5, wherein providing the user interface further comprises
   rendering the all-focus image and the Z-stack simultaneously in distinct first and second windows on a single display using a split screen view; and synchronizing views of the all-focus image and the Z-stack so that altering the selected portion in the all-focus image creates a corresponding alteration in the Z-stack and vice-versa.

7. The method of claim 6, wherein the first and second windows are overlapping or non-overlapping, and wherein a window of the Z-stack is continually visible or visible upon user request.

8. The method of claim 5, wherein providing the user interface further comprises
rendering the all-focus image and the Z-stack simultaneously in distinct first and second windows on separate displays; and
synchronizing views of the all-focus image and the Z-stack so that altering the selected portion in the all-focus image creates a corresponding alteration in the Z-stack and vice-versa.

9. The method of claim 5, wherein providing the user interface allows simultaneously viewing and focusing an entirety of the specimen in a single slice of digital image and browsing the single slice of digital image in two dimensions.

10. The method of claim 1, wherein instead of switching to the image, switching occurs between several images of the original sequence of images if the point is located where the specimen has more than one unique focused depth.

11. A method for navigating images in microscopic imaging, the method comprising:
providing a user interface with two or more views to a user for selecting, in a first view of the two or more views, a portion of an all-focus image composed from an original sequence of images of a specimen at different depths of focus, the original sequence of images forming a Z-stack;
synchronously displaying, in a second view of the two or more views, one or more images from the Z-stack that are in focus at the selected portion of the all-focus image, wherein the one or more images are sequentially displayed in response to user input according to a depth of focus, the user input comprising one or more of a mouse click, touch input, gesture and keyboard input;
identifying at least one of a point, and an area surrounding the point, in at least one of the all-focus image, and the original sequence of images; and
switching between several images of the original sequence of images when the point is located where the specimen has more than one unique focused depth.

12. An apparatus for navigating images in microscopic imaging, the apparatus comprising:
a computing device for providing a user interface with two or more views to a user for selecting, in a first view of the two or more views, a portion of an all-focus image composed from an original sequence of images of a specimen at different depths of focus, the original sequence of images forming a Z-stack, wherein the computing device:
identifies at least one of a point, and an area surrounding the point, in at least one of the all-focus image, and the original sequence of images; and
switches to an image which is most in focus, relative to other images in the original sequence of images, at the at least one of the point, and the area surrounding the point, in the original sequence of images; and
an image navigation module that synchronously displays on a display coupled to the computing device, in a second view of the two or more views, one or more images from the Z-stack that are in focus at the selected portion of the all-focus image, wherein the one or more images are sequentially displayed in response to user input according to a depth of focus, the user input comprising one or more of a mouse click, touch input, gesture and keyboard input.

13. The apparatus of claim 12, wherein the computing device further forms the all-focus image by reducing dimensionality of the original sequence of images of a specimen.

14. The apparatus of claim 13, wherein all-focus image generator further reduces the original sequence of images from three dimensions to two dimensions.

15. The apparatus of claim 14, wherein the all-focus image generator further comprises:
combining the original sequence of images with differing focus depths to form the all-focus image.

16. The apparatus of claim 12, wherein providing the user interface comprises
rendering at least one of the all-focus image and the original sequence of images using the computing device; and
alternating between displaying the all-focus image and the original sequence of images based on the selected portion.

17. The apparatus of claim 16, wherein providing the user interface further comprises
rendering the all-focus image and the Z-stack simultaneously in distinct first and second windows on a single display using a split screen view; and
synchronizing views of the all-focus image and the Z-stack so that altering the selected portion in the all-focus image creates a corresponding alteration in the Z-stack and vice-versa.

18. The apparatus of claim 17, wherein the first and second windows on a display coupled to the computing device are overlapping or non-overlapping, and wherein a window of the Z-stack is continually visible or visible upon user request.

19. The apparatus of claim 16, wherein providing the user interface further comprises
rendering the all-focus image and the Z-stack simultaneously in distinct first and second windows on separate displays; and
synchronizing views of the all-focus image and the Z-stack so that altering the selected portion in the all-focus image creates a corresponding alteration in the Z-stack and vice-versa.

20. The apparatus of claim 16, wherein the image navigation module further provides the user interface to allow simultaneously viewing and focusing the specimen entirely in a single slice of digital image and browsing the single slice of digital image in two dimensions.

* * * * *